(12) United States Patent
Boyle

(10) Patent No.: US 6,725,057 B1
(45) Date of Patent: Apr. 20, 2004

(54) PERSONAL COMMUNICATIONS APPARATUS

(75) Inventor: Kevin R. Boyle, Horsham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 329 days.

(21) Appl. No.: 09/663,945

(22) Filed: Sep. 18, 2000

(30) Foreign Application Priority Data

May 10, 1999 (GB) ............................................. 9923511

(51) Int. Cl.⁷ ................................................. H04B 1/38
(52) U.S. Cl. .................................... 455/550; 455/277.1
(58) Field of Search ................................. 455/550, 575, 455/90, 269, 101, 129, 272, 274, 277.1, 277.2; 343/700, 900

(56) References Cited

U.S. PATENT DOCUMENTS

| | | | | |
|---|---|---|---|---|
| 4,829,591 A | * | 5/1989 | Hashimoto et al. | 455/90.3 |
| 5,771,022 A | | 6/1998 | Vaughan et al. | 343/702 |
| 5,903,822 A | * | 5/1999 | Sekine et al. | 455/575 |
| 5,918,189 A | * | 6/1999 | Kivela | 455/575.1 |
| 5,990,838 A | * | 11/1999 | Burns et al. | 343/702 |
| 6,006,117 A | * | 12/1999 | Hageltorn et al. | 455/575 |
| 6,021,317 A | * | 2/2000 | Irvin | 455/78 |
| 6,212,368 B1 | * | 4/2001 | Ramesh et al. | 455/277.2 |
| 6,297,780 B1 | * | 10/2001 | Kirisawa | 343/703 |
| 6,330,433 B1 | * | 12/2001 | Jager | 455/277.2 |
| 6,434,369 B1 | * | 8/2002 | Kanayama | 455/90 |
| 6,560,443 B1 | * | 5/2003 | Vaisanen et al. | 455/73 |
| 6,574,461 B1 | * | 6/2003 | Skold | 455/277 |
| 2002/0055336 A1 | * | 5/2002 | Hong | 455/90 |

FOREIGN PATENT DOCUMENTS

| | | | | |
|---|---|---|---|---|
| EP | 0652646 A1 | 5/1995 | ............ | H04B/1/38 |
| FR | EP0652646 | * 10/1994 | | |

* cited by examiner

Primary Examiner—Nay Maung
Assistant Examiner—Tan Trinh
(74) Attorney, Agent, or Firm—Jack D. Slobod

(57) ABSTRACT

A personal communications apparatus, for example a cellular telephone handset, has an antenna diversity arrangement comprising first and second antennas (102A, 102B) arranged with their polarisation axes slanted with respect to the median plane of the handset body (218). By a suitable choice of inclination angles one of the antennas can be arranged to be substantially vertical in use, whether by right or left handed users, thereby improving received signal strength from a vertically polarised base station. The arrangement also enhances diversity operation, since the correlation between the field strengths received by the antennas is reduced by their relative orientation.

When the apparatus is used in a system employing a Code Division Multiple Access (CDMA) techniques, the apparatus preferably includes a 2D Rake receiver for mitigating the effects of multipath fading and interference.

7 Claims, 1 Drawing Sheet

PERSONAL COMMUNICATIONS APPARATUS

The present invention relates to a personal communications apparatus, for example a cellular telephone handset, having an antenna diversity arrangement.

In cellular telecommunications systems radio signals are transmitted from a base station to a mobile station and vice versa. The radio signals transmitted by cellular base stations are normally vertically polarised. Cellular handsets typically have an antenna, such as a normal mode helix or extendible monopole, mounted at the top of the handset and approximately in line with the longest axis (median plane) of the handset. Such antennas are therefore polarised along this axis, so that when the handset is held vertically the antenna is vertically polarised.

However, cellular handsets are typically held at an angle of between 45° and 75° to the vertical direction, with a mean of about 60°, to align the microphone with the user's mouth and the loudspeaker with the user's ear (*Mobile Antenna Systems Handbook*, K Fujimoto and J R James, Artech House, 1994, page 227). By holding the handset at such an angle a polarisation loss is introduced in the transmission of signals between the handset and base station.

This problem has been recognised, for example in EP-A-0 652 646 which discloses a cellular handset having a pivoted antenna mast which is weighted so that the mast remains substantially vertical for a wide range of handset orientations. However, such an arrangement requires significant space inside the handset and is prone to jamming.

Additional problems with the use of cellular handsets are multipath fading, caused by signals from the base station to the handset travelling along paths of different lengths, and various other types of interference. Such problems can be addressed by the use of antenna diversity or other spatial processing techniques.

An object of the present invention is to provide a personal communications apparatus having improved radio reception.

According to the present invention there is provided a personal communications apparatus comprising a body including transceiver circuitry and an antenna diversity arrangement comprising first and second antennas arranged having their respective polarisation axes oppositely inclined to the median plane of the body.

Although the inclination of the antennas would normally be symmetrical about the median plane, this will not always be the optimum orientation. For example, if a plane through the location of the handset's microphone and loudspeaker is not parallel to the median plane the antennas may be inclined symmetrically with respect to this plane instead (since it is location of the microphone and loudspeaker that determines the orientation of the handset in normal use). Hence, in the present specification and claims the term "median plane" is to be understood to include a plane through the microphone and loudspeaker, especially when these are not arranged on the plane of symmetry of the body.

Embodiments of the present invention will now be described, by way of example, with reference to the accompanying drawings, wherein.

In the drawings the same reference numerals have been used to indicate corresponding features.

Figure 1:
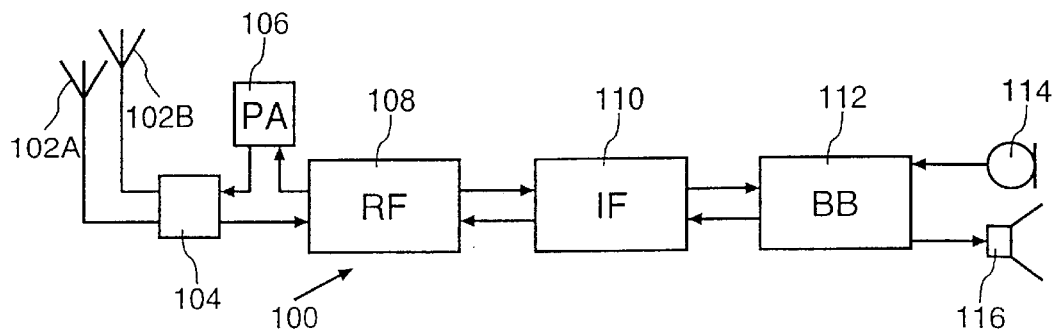
FIG. 1 is a block schematic diagram of a personal communications apparatus.

A block schematic diagram of a personal communications apparatus 100 having an antenna diversity arrangement is shown in FIG. 1. This particular example is based on a GSM (Global System for Mobile communications) cellular telephone, but similar principles apply to other cellular telephony standards and to other personal communications apparatus, for example two-way radio.

Consider first the receiver part of the circuitry operating on a voice telephone call. Two spatially-separated antennas 102A, 102B receive signals from a remote base station, which signals are processed by a diversity unit 104 to generate a single radio frequency (RF) signal. In its simplest form the unit 104 selects the stronger of the two signals, but other combining methods are well known and may be used instead, for example maximal ratio combining at baseband. The RF signal then passes into a RF transceiver block 108, which down-converts the RF signal to a lower intermediate frequency (IF).

The IF signals pass to an intermediate frequency block (IF) 110 which down-converts the IF signal to a baseband signal. This signal then passes to a baseband processing block (BB) 112. This block performs a variety of tasks, including speech decoding, channel decoding and deinterleaving. Received audio signals are converted back to analogue signals for reproduction on a loudspeaker 116 or other suitable output device.

Now consider the transmission side of the circuitry. Voice signals are received by a microphone 114, or other suitable input device, and passed to the baseband processing block 112, where they are converted to digital form. The baseband processing block 112 then encodes the speech and performs channel coding and interleaving to reduce the received bit error rate. The resultant signal for transmission is modulated and passed to the IF block 110. Here the baseband signals are transposed up to an IF frequency.

The IF signal is passed to the RF transceiver block 108 where it is mixed up to the RF transmission frequency and amplified to the required power by a power amplifier (PA) 106. It is then passed to the diversity unit 104 for transmission by one or both of the antennas 102. The phasing of the transmitted signals could be chosen to minimise proximity losses.

In a personal communications apparatus employing Code Division Multiple Access (CDMA) techniques, for example one operating according to the emerging Universal Mobile Telecommunications Standard (UMTS), a the diversity unit 104 preferably includes a 2D Rake receiver. Such receivers are described for example in "Performance Analysis of a Compact Array Receiver for CDMA Cellular Communications", Proceedings of IEEE Military Communications Conference, October 1998, pages 182 to 186. They are capable of mitigating the effects of multipath fading and interference, typically found in mobile communications environments, by using the time (delay spread) and space (beamforming, diversity) characteristics of the signals received.

Figure 2:
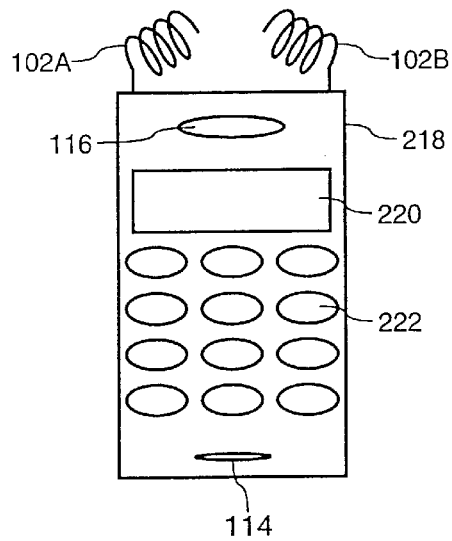
FIG. 2 is a view of a personal communications apparatus made in accordance with the present invention.

One common form of a personal communications apparatus is a cellular telephone handset. FIG. 2 is a view of an embodiment of such a handset made in accordance with the present invention. The handset comprises a body 218 on which are mounted first and second antennas 102A, 102B. The majority of the circuitry for the apparatus is disposed inside the body 218, including a diversity unit 104 which further includes a 2D Rake receiver of conventional design. The microphone 114 and loudspeaker 116 are located behind openings in the body 218. Also provided is a display 220 and a plurality of keys 222 for controlling the apparatus.

In the embodiment shown in FIG. 2 the antennas 102A, 102B are helical antennas each of which has its polarisation axis inclined towards the median plane of the body 218 and making an angle of approximately 60° with that plane. Apart from their orientation the antennas 102A, 102B are conventional helical antennas. The body 218 may include a plastic radome so that the antennas are not visible. When the handset is in use and being held in a user's left hand the first antenna 102A will be maintained in a substantially vertical orientation, while if the handset is held in the user's right hand the second antenna 102B will be maintained in a substantially vertical orientation.

Hence, whether the handset is held in the user's left or right hand, one of the antennas 102A, 102B will be substantially vertically polarised while the other antenna will be substantially horizontally polarised. The vertically polarised antenna will therefore have enhanced gain compared to the horizontally polarised antenna.

When there is a high delay spread the 2D Rake receiver is most effective at processing the time variation of the received signal and predominantly uses the signal from the vertically polarised antenna. For example, a UMTS signal has a bandwidth of 4 MHz, which corresponds to 250 ns time resolution. In an outdoor environment having a typical delay spread of 2 μs this enables use of up to 8 Rake fingers and provides good resolution of multipath effects.

When there is a low delay spread the spatial dimension of the Rake receiver dominates. For example in an indoor environment with a typical delay lo spread of less than 100 ns a Rake receiver cannot resolve multipath effects in a signal of 4 MHz bandwidth. Diversity action is made possible by multipath cross-polarisation effects (as well as because the "horizontally polarised" antenna is not truly horizontal since the angle between the axes of the two antennas is approximately 120°). For efficient diversity operation the field strengths received by each of the antennas 102A, 102B should be uncorrelated. The angle between the antennas in this embodiment of the present invention greatly reduces the correlation between the signals received by each antenna, thereby improving the diversity performance.

The embodiments of the present invention described above use a helical antenna. However, other types of antennas could be used instead, for example a meander line antenna printed on a printed circuit board substrate included in the body 218 for ease of construction. For optimum performance the antennas 102A, 102B are preferably linearly polarised.

To demonstrate the effectiveness of an antenna arrangement in accordance with the present invention, the Mean Effective Gain (MEG) for some sample antenna arrangements was determined. The MEG is the equivalent of the free space antenna gain in a multipath environment, see for example *Mobile Antenna Systems Handbook*, K Fujimoto and J R James, Artech House, 1994, pages 86 to 114. It can be written as:

$$MEG = \frac{1}{1+X} \int_\Omega (G_\theta(\Omega) p_\theta(\Omega) + X G_\phi(\Omega) p_\phi(\Omega)) \, d\Omega$$

where:

$G_\theta$ and $G_\phi$ are the antenna power gains in the θ and φ polarisations respectively (where θ and φ have their normal meanings in spherical coordinates);

X is the cross-polar ratio $P_\phi/P_\theta$, where $P_\theta$ and $P_\phi$ are the powers that would be received by isotropic θ and φ polarised antennas respectively in a multipath environment;

$P_\theta$ and $P_\phi$ are the angular density functions (angle of arrival probability distributions) of the incoming θ and φ polarised plane waves respectively; and Ω is the solid angle.

Two multipath environments were modelled, an urban macrocell and an urban microcell. In the macrocell a cross-polarisation ratio of −6 dB was assumed, with mean angles of arrival about 30° from a line between the handset and the base station. In the microcell a cross-polarisation ratio of −9 dB was assumed, with mean angles of arrival close to a line between the handset and the base station.

Two antenna arrangements were modelled, both on a metallic handset having dimensions 10×4×1 cm, at a frequency of 2 GHz. In the first arrangement 20 mm monopole antennas mounted on the handset were used. In the second 25 mm dipole antennas mounted just above the handset were used (simulating the effect of half wave helical antennas which are typically of this physical length and draw little current from the handset ground plane).

| Environment | MEG Change (dB) | |
|---|---|---|
| | Monopole | Dipole |
| Urban Macrocell | +0.3 | +1.5 |
| Urban Microcell | +0.4 | +2.3 |

The results for the monopole show only a slight improvement in MEG because most of the radiation in this case comes from the handset rather than the antenna. The results for the dipole are representative of what could be achieved in practice using helical antennas, and show a significant improvement.

Although in the embodiments of the present invention described above the first and second antennas 102A, 102B are each inclined at an angle of approximately 60° to the median plane of the handset body, this angle may not be optimum in all situations. The optimum angle is a trade-off between two main factors, firstly aligning the polarisation of one of the antennas 102A, 102B as closely as possible with that of the transmitter, and secondly minimising the correlation between the field strengths received by the antennas. Subsidiary factors include: considerations of the probability distribution of the angle of arrival of incoming waves; the typical cross-polarisation ratio in the environments where the handset will be used; and the fact that as the inclination of an antenna on a handset is increased the currents induced on the handset body increase, thereby reducing the efficiency of the antenna.

In a non-illustrated embodiment of the present invention the first and second antennas 102A, 102B may be mounted so that their polarisation axes are inclined away from each other. With such an arrangement when the telephone is held in the user's right hand the antenna 102A will have a substantially vertical orientation and when held in the left hand the antenna 102B will have a substantially vertical orientation.

It should be remembered that the definition of median plane in the present specification and claims includes a plane through the microphone 114 and loudspeaker 116, especially when these are not arranged on the plane of symmetry of the body 218. In such a case the angle at which the phone is held may be different for left and right-handed use and the antennas may be inclined symmetrically with respect to a plane through the microphone 114 and loudspeaker 116.

Although the present invention was described above in relation to an embodiment incorporated in a cellular telephone handset, it is equally applicable to other forms of personal communications apparatus. For example, the apparatus may be a Personal Digital Assistant (PDA) incorporating radio communication functionality. Such an apparatus, in normal use, may have a greater width than depth. The antennas 102A, 102B may therefore be inclined from the front to the back of the apparatus, or vice versa.

From reading the present disclosure, other modifications will be apparent to persons skilled in the art. Such modifications may involve other features which are already known in the design, manufacture and use of personal communications apparatus and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

What is claimed is:

1. A personal communications apparatus, comprising:
   a body including a transceiver circuit; and
   an antenna diversity arrangement extending from said body, said antenna diversity arrangement including a first antenna and a second antenna,
   wherein a first polarization axis of said first antenna and a second polarization axis of said second antenna are oppositely inclined with respect to a median plane associated with said body.

2. The apparatus as claimed in claim 1, wherein the first polarization axis and the second polarization axis are inclined 45° to 75° to the median plane.

3. The apparatus as claimed in claim 1 or 2, wherein said transceiver circuitry includes a 2D Rake receiver for processing signals received by said first antenna and said second antenna.

4. The apparatus as claimed in claim 1, further comprising:
   a microphone located within said body; and
   a loudspeaker located within said body,
      wherein an alignment of said microphone and said loudspeaker define the median plane associated with said body.

5. The apparatus as claimed in claim 1, wherein a symmetrical plane of said body defines the median plane associated with said body.

6. The apparatus as claimed in claim 1, wherein said first antenna and said second antenna are inclined toward each other.

7. The apparatus as claimed in claim 1, wherein said first antenna and said second antenna are inclined away from each other.

* * * * *